United States Patent
Forbes et al.

(10) Patent No.: US 10,261,893 B2
(45) Date of Patent: Apr. 16, 2019

(54) IMPLICIT COORDINATION OF DEPLOYMENT AND REGRESSION TESTING ACROSS DATA CENTERS AND SYSTEM CLUSTERS

(71) Applicant: salesforce.com, inc., San Francisco, CA (US)

(72) Inventors: Randall S. Forbes, Fishers, IN (US); Brian D. McGreer, Indianapolis, IN (US); Jason David Borneman, Fishers, IN (US)

(73) Assignee: salesforce.com, inc., San Francisco, CA (US)

( * ) Notice: Subject to any disclaimer, the term of this patent is extended or adjusted under 35 U.S.C. 154(b) by 248 days.

(21) Appl. No.: 15/369,463

(22) Filed: Dec. 5, 2016

(65) Prior Publication Data

US 2018/0157584 A1 Jun. 7, 2018

(51) Int. Cl.
*G06F 11/00* (2006.01)
*G06F 11/36* (2006.01)

(52) U.S. Cl.
CPC ......... *G06F 11/3692* (2013.01); *G06F 11/00* (2013.01); *G06F 11/3664* (2013.01); *G06F 11/3684* (2013.01); *G06F 11/3688* (2013.01)

(58) Field of Classification Search
CPC ............. G06F 11/3692; G06F 11/3664; G06F 11/3684; G06F 11/3688
See application file for complete search history.

(56) References Cited

U.S. PATENT DOCUMENTS

| | | | | |
|---|---|---|---|---|
| 9,141,522 B1* | 9/2015 | Zias | ................... | G06F 11/3688 |
| 2004/0044993 A1* | 3/2004 | Muller | ................ | G06F 11/3664 717/124 |
| 2009/0313606 A1* | 12/2009 | Geppert | ............. | G06F 11/3676 717/124 |
| 2013/0080999 A1* | 3/2013 | Yang | .................... | G06F 11/3664 717/124 |
| 2013/0152047 A1* | 6/2013 | Moorthi | ................ | G06F 11/368 717/124 |
| 2015/0007146 A1* | 1/2015 | Li | ........................ | G06F 11/3684 717/130 |
| 2015/0286556 A1* | 10/2015 | Ellis | .................... | G06F 11/3684 717/125 |

* cited by examiner

*Primary Examiner* — Philip Guyton
(74) *Attorney, Agent, or Firm* — Morris & Kamlay LLP

(57) ABSTRACT

The disclosed methods and systems for coordinating deployment and regression testing across data centers and system clusters in multiple service clouds include accessing test suites via a versioning platform that maintains a metadata notation of an applicable-version to which a version of a test suite applies. They include receiving a request-to-test to run a selected test suite against a selected system; making a machine-to-machine query about the selected system and receiving back a response that specifies a version-to-be-tested; automatically selecting from the versioning platform a test suite version with the applicable-version that supports the version-to-be-tested consistent with the metadata notation of the applicable-version of the selected test suite; and reporting results of running the selected test suite. The request-to-test need not include the version of the selected test to run, and can specify use of authentication credentials and multiple selected test suites to run against one or more systems.

22 Claims, 14 Drawing Sheets

TACOS Test Automation Config Online Service                                      Logout Environments  Features  Product Versions  Test Projects  Secure Data Stores  Administration  Execute Tests  Tests Results 322                                      336
                                                                  🔍 Search              ⊞ New  ⟳ Refresh

| Name # | LongName | Product Version # | Created By | Created On | Updated By | Updated On # |
|---|---|---|---|---|---|---|
| QA1S1 | QA1-Stack1 | 2016-06.00 | API | 1/8/2016 at 3:46PM | User1 | 8/17/2016 at 8:52PM |
| QA1S2 | QA1-Stack2 | 2016-06.00 | API | 1/8/2016 at 3:46PM | User2 | 8/22/2016 at 12:21PM |
| Dev_Box_CMS | Dev box for CMS | 2016-05.00 | User3 | 8/12/2016 at 6:32PM | User3 | 8/12/2016 at 16:32PM |
| QA2S1 | QA2-Stack1 | 2016-05.00 | API | 1/8/2016 at 3:46PM | User4 | 7/9/2016 at 11:25AM |
| QA3S1 | QA3-Stack1 | 2016-05.00 | API | 1/8/2016 at 3:46PM | User5 | 8/16/2016 at 5:25PM |
| SB | Production - Salesforce | 2016-05.00 | API | 1/8/2016 at 3:46PM | User6 | 8/22/2016 at 9:11AM |
| ixmlds | The Identity team's dev environment | 2016-05.00 | User7 | 7/15/2016 at 1:52PM | User7 | 7/15/2016 at 1:52PM |
| S1 | Production - Indianapolis POD1 | 2016-04.02 | API | 1/8/2016 at 3:46PM | User8 | 8/17/2016 at 8:50AM |
| S4 | Production - Las Vegas | 2016-04.02 | API | 1/8/2016 at 3:46PM | User9 | 8/17/2016 at 8:51AM |
| S6 | Production - Indianapolis POD2 | 2016-04.03 | API | 1/8/2016 at 3:46PM | User1 | 8/11/2016 at 8:51AM |
| S7 | Production - Atlanta | 2016-04.02 | API | 1/8/2016 at 3:46PM | User2 | 8/17/2016 at 8:51AM |
| ProdSupport | Production Support | 2016-04.01 | API | 1/8/2016 at 3:46PM | User3 | 8/17/2016 at 8:52AM |
| QA2S2 | QA2-Stack2 | 2016-05.03 | API | 1/8/2016 at 3:46PM | User1 | 8/11/2016 at 3:50PM |
| S2 | Production - Expedia | 2016-05.03 | API | 1/8/2016 at 3:46PM | User5 | 7/9/2016 at 11:23AM |
| S3 | Production - IROLA | 2016-05.03 | API | 1/8/2016 at 3:46PM | User6 | 7/9/2016 at 11:24AM |
| QA3S2 | QA3-Stack2 | 0000-00.00 | API | 1/8/2016 at 3:46PM | User7 | 1/19/2016 at 2:10PM |

TACOS version 4.0.0
Hello, User1, you are in admin

◀ Prev 1 2 Next ▶

FIG. 3

TACOS Test Automation Config Online Service

Logout

Environments  Features  [Product Versions]  Test Projects  Secure Data Stores  Administration  Execute Tests  Tests Results

424

[Search]  [New] [Refresh]  Delete

| Product ◊ | Version ◊ | Created By | Created On ◊ | Last Updated By | Last Updated On ◊ | |
|---|---|---|---|---|---|---|
| SFMC | 2.3.5-02.00 | API | 7/26/2016 - 1:15PM | API | 7/26/2016 - 1:15PM | ☐ |
| SFMC | 2016-06.00 | User1 | 8/17/2016 - 8:52PM | User1 | 8/17/2016 - 8:52PM | ☐ |
| SFMC | 2016-05.00 | User2 | 7/9/2016 - 11:25AM | User2 | 7/9/2016 - 11:25AM | ☐ |
| SFMC | 2016-04.04 | User3 | 8/24/2016 - 8:43PM | User3 | 8/24/2016 - 8:43PM | ☐ |
| SFMC | 2016-04.03 | User4 | 8/1/2016 - 8:52AM | User4 | 8/1/2016 - 8:52AM | ☐ |
| SFMC | 2016-04.02 | User5 | 7/27/2016 - 11:10PM | User5 | 7/27/2016 - 11:10PM | ☐ |
| SFMC | 2016-04.01 | User6 | 7/19/2016 - 3:38PM | User6 | 7/19/2016 - 3:38PM | ☐ |
| SFMC | 2016-04.00 | User7 | 8/31/2016 - 3:51PM | User7 | 8/31/2016 - 3:51PM | ☐ |

462    464

[Prev] 1 2 3 [Next]

FIG. 4

TACOS Test Automation Config Online Service                                                                                                Logout Environments | Features | Product Versions | Secure Data Stores | Administration | Execute Tests | Tests Results

[Test Projects] — 524

[Search]                                                          [New] [Refresh]

| Registration Name❖ | Github Organization Name | Github Repository Name | Github Repository URL | Contact Email Address | Contact Person | Created By | Last Updated By |
|---|---|---|---|---|---|---|---|
| Active Audience Tests | MC-CoreAutomation | ActiveAudiences APITests | git@github.exacttarget.com:MC-CoreAutomation/ActiveAudiencesAPITests.git | User1@domain.net | User1 | User1 | User1 |
| Analytics API Tests | Platform-Automation | AnalyticsAPITest | git@github.exacttarget.com:Platform-Automation/AnalyticsAPITests.git | User2@domain.net | User2 | User2 | User2 |
| Approvals Service Tests | Platform-Automation | ApprovalAPITests | git@github.exacttarget.com:Platform-Automation/ApprovalsAPITests.git | User3@domain.net | User3 | User3 | User3 |
| Audience Builder API Tests | Platform-Automation | AudienceBuilder APITests | git@github.exacttarget.com:Platform-Automation/AudienceBuilderAPITests.git | User4@domain.net | User4 | User4 | User4 |
| Audience Builder UI Tests | Platform-Automation | AudienceBuilder UITests | git@github.exacttarget.com:Platform-Automation/AudienceBuilderUITests.git | User5@domain.net | User5 | User5 | User5 |
| Automation Studio Test | MC-CoreAutomation | Automation StudioAPITests | git@github.exacttarget.com:MC-CoreAutomation/AutomationStudioAPITests.git | User6@domain.net | User6 | User6 | User6 |
| Basic Test Project | QE-Automation | basic-test-project | git@github.exacttarget.com:QE-Automation/basic-test-project.git | User7@domain.net | User7 | User7 | User7 |
| CloudPagesTests | MC-CoreAutomation | CloudPages APITests | git@github.exacttarget.com:MC-CoreAutomation/CloudPagesAPITests.git | User8@domain.net | User8 | User8 | User8 |

562 —

[Prev] 1 2 3 [Next]

FIG. 5

Details

Registration Name:
Active Audience Tests                    [622]

Github Organization Name:
MC-Core Automation

Github Repository Name:
ActiveAudiencesAPITests

Github Repository URL:
https://github.xxxxxxxx.com/MC-Core/Automation/A    [642]

Contact Email Address:
User1@domain.net

Contact Person:
MC Core Automation

Created by           on 1/14/2016 - 11:27 AM
Last updated by      on 7/13/2016 - 9:32 AM

[✓ Save] [✗ Cancel]

[🗑 Delete Active Audience Tests]

Versions

[🔍 Search]  [✚ New]  [⟳ Refresh]

| Github Reference Type | Github Reference | Product Version # | Created By | Created On | Last Updated By | Last Updated On | Edit | Delete |
|---|---|---|---|---|---|---|---|---|
| branch | 201603 | 2016-03.00 | User1 | 3/20/2016 - 9:08PM | User1 | 5/20/2016 - 9:08PM | ☐ | 🗑 |
|  | 201602.0.0 | 2016-02.00 | User2 | 2/4/2016 - 10:28AM | User2 | 2/4/2016 - 10:28AM | ☐ | 🗑 |
| tag | 201601.1.2 | 2016-01.02 | User3 | 5/31/2016 - 3:52PM | User3 | 5/31/2016 - 3:52PM | ☐ | 🗑 |

[662]            [664]

[⬅ Prev] [1] [Next ➡]

FIG. 6

TACOS Test Automation Config Online Service

Environments  Features  Product Versions  Test Projects  Secure Data Stores  Adimintration  Execute Tests  Tests Results

Execute Tests

Test Collection Name:
Patent Test

Environment to Test:
Select an environment ▽  — 722

Select an environment
Dev_Box_CMS
ProdSupport
QA1S1  — 762
QA1S2
QA2S1
QA2S2
QA3S1
QA3S2
S1      ...sts
S2      ts
S3
S4      ts
S5
S6      temTests
S7
S8      tests
teamlog Email Notifications:
☐ Me
☐ Test Project Owner
☐ Others
example@salesforce.com
example2@salesforce.com Tags to Execute:
A Scenario will be run if
⊙ it has any of these tags
○ it has every one of these tags
@tag1,@tag2,@tag3...

Scenario will not be run if it has any of these tags
@tag1,@tag2,@tag3...

728 → Execute Tests

FIG. 7

Accounts

| MID | Features | App ID | Client ID | Client Secrets | Created By | Created On | Updated By | Updated On |
|---|---|---|---|---|---|---|---|---|
| 2001543 | Mobile-Connect-2 | 1234ABCD56789EF0 | ab123456-7c89-de01-f2g34h | Ab1234cd567E89f0123G4hij | User1 | 1/14/2016 - 3:14PM | User1 | 8/16/2016 - 2:15PM |
| 2001692 | ASTest | 2234ABCD56789EF0 | cd123456-7c89-de01-f2g34h | Cd1234cd567E89f0G12 34hij | User2 | 4/4/2016 - 11:51AM | User2 | 4/4/2016 - 1:56PM |
| 2004888 | CP_Smoke | 3234ABCD56789EF0 | ef123456-7c89-de01-f2g34h | Ef1234cd567E89fG0123G4hij | User3 | 7/8/2016 - 1:56PM | User3 | 7/8/2016 - 1:56PM |
| 2004889 | Content | 4234ABCD56789EF0 | gh123456-7c89-de01-f2g34h | Gh1234cd567E89f0G12 34hij | User4 | 7/12/2016 - 1:34PM | User4 | 7/12/2016 - 1:34PM |
| 2004890 | CMS-BU-1 | 5234ABCD56789EF0 | ij123456-7c89-de01-f2g34h | Ij1234cd567E89fG0123 4hij | User5 | 7/12/2016 - 1:36PM | User5 | 7/12/2016 - 1:36PM |
| 2004891 | CMS-BU-2 | 6234ABCD56789EF0 | KL123456-7c89-de01-f2g34h | KL1234cd567E89fG0123 4hij | User6 | 7/12/2016 - 1:37PM | User6 | 7/12/2016 - 1:37PM |
| 2004951 | CP_Smoke2016 | 7234ABCD56789EF0 | MN123456-7c89-de01-f2g34h | MN1234cd567E89fG01 234hij | User7 | 8/5/2016 - 8:37AM | User7 | 8/5/2016 - 8:37AM |
| 2004975 | Content_2016 | 8234ABCD56789EF0 | PR123456-7c89-de01-f2g34h | PR1234cd567E89fG012 34hij | User8 | 8/10/2016 - 3:25PM | User8 | 8/10/2016 - 3:25PM |

Endpoints

| Type | Endpoint | Created By | Created On | Updated By | Updated On |
|---|---|---|---|---|---|
| FTP_URL | ftp.s2.qa1.exacttarget.com | API | 1/8/2016 - 3:46PM | API | 1/8/2016 - 3:46PM |
| MC_URL | https://mc.s2.qa1.exacttargetapis.com/cloud/ | API | 1/8/2016 - 3:46PM | API | 1/8/2016 - 3:46PM |
| REST_Auth_URL | https://auth-qa2.exacttargetapis.com | API | 1/8/2016 - 3:46PM | API | 1/8/2016 - 3:46PM |
| REST_LEGACY_URL | https://rest.s2.qa1.exacttarget.com | API | 1/8/2016 - 3:46PM | API | 1/8/2016 - 3:46PM |
| REST_URL | https://www.exacttargetapis.com | API | 1/8/2016 - 3:46PM | API | 1/8/2016 - 3:46PM |
| WS_Auth_WSDL | https://webservice.s2.qa1.exacttarget.com/Authentication/Auth.svc?WSDL | API | 1/8/2016 - 3:46PM | API | 1/8/2016 - 3:46PM |
| WS_URL | https://webservice.s2.qa1.exacttarget.com/Service.asmx | API | 1/8/2016 - 3:46PM | API | 1/8/2016 - 3:46PM |
| WS_WSDL | https://webservice.s2.qa1.exacttarget.com/ETFramework.wsdl | API | 1/8/2016 - 3:46PM | API | 1/8/2016 - 3:46PM |

TACOS Test Automation Config Online Service                                                                                       Logout Environments  Features  Product Versions  Test Projects  Secure Data Stores  Administration  Execute Tests  [Tests Results] ← 1128

« Back to Test Results

Execution Collection Details

Test Collection:          Requested By:
BUILD 155.1.0.54          User1
Environment:              Requested Time:
QA151                     11/17/2016 at 10:45AM
Product Version:          Total Projects Executed:
2017-01.00                31
Tag Executed:             Projects Failed:
(@smoke)

[🔍 Search]                                                                              [⏎ Return] [⟳ Refresh]

| Project Name ◆ | Project Status ◆ | Total Scenarios | Scenarios Skipped | Scenarios Passed ◆ | Scenarios Failed ◆ | Execution Duration (HH:MM:SS) ◆ | TeamCity Build Id | Project Version | Message |
|---|---|---|---|---|---|---|---|---|---|
| ☐ TriggeredSend Messaging_Tests | complete pass | 27 | 0 | 27 | 0 | 00:14:27 | 5864347 | branch:Tests_For_Contacts | |
| ☐ TestDownRunCases | complete with errors | 126 | 0 | 84 | 42 | 00:19:20 | 5864361 | branch:master | |
| ☐ SMS ToGO Tests | complete with errors | 112 | 0 | 92 | 20 | 01:39:31 | 5864346 | branch: taces integration | |
| ☐ SMS Global Navigation | requested | | | | | | 5864370 | branch:master | |
| ☐ Salesforce IntegrationDefinition | complete pass | 35 | 0 | 35 | 0 | 00:04:12 | 5864362 | branch: split_features | |
| ☐ Mobile PushTests | complete with errors | | | 5 | 1 | 00:04:37 | 5864356 | | No artifacts found for total counts. |

IMPLICIT COORDINATION OF DEPLOYMENT AND REGRESSION TESTING ACROSS DATA CENTERS AND SYSTEM CLUSTERS

FIELD OF DISCLOSURE

The present invention relates to implicit coordination of deployment and regression testing across data centers and system clusters. The methods disclosed include managing digital data for a plurality of tenants to software instances, each tenant of the plurality of tenants comprising a group of users who share a common access with a specific set of privileges to a software instance of at least one application.

INTRODUCTION

Enterprise companies provide digital automation and analytics software and services via service clouds that map to data centers. For example, a marketing cloud can provision clients to a specific data center and make available a platform as a service (PaaS) that provides a set of applications that are usable by the client. Users can utilize customer relationship management (CRM) and other data for building and managing personalized email campaigns, and can connect social experiences to marketing, sales and service with social media applications. Analytics software and services include email, mobile, social and online marketing to clients. Additional applications make it possible to use short message service (SMS), multimedia messaging service (MMS), push notifications and group messaging to reach clients anytime, anywhere.

Service clouds can map across multiple data centers, and the application platform for creating a PaaS can be implemented using multiple different software languages on any stack in any cloud. Applications that support clients across data centers and service clouds are constantly being developed and enhanced—motivating the need for consistent coordination of deployment and regression testing across data centers and system clusters, for major product version releases, minor software updates and hot fixes for bugs in a version of a product release, and for extended versions of a product release.

Version release deployment testing occurs in multiple scenarios for testing projects: testing against a production environment, testing against an environment that is planned for release after other production elements, and testing against staging environments used for testing a release deployment. Automated test developers also write test suites against existing functionality and merge the newly-written tests into their existing test codebase.

Quality Engineering personnel manage and control deployment and regression testing, and need to run the latest-available valid test code for the version being deployed to a production environment. Additionally, pre-release and production release rollback testing present specific requirements for managing requests to run a particular version of a test suite for an applicable version of software for a selected system or for multiple systems to be tested and then deployed simultaneously. For an enterprise, as many as a thousand tests can be stored in a testing repository.

An opportunity arises to implicitly coordinate deployment and regression testing across data centers and system clusters for production versions and for updates and hot fixes to production versions, making it feasible for very large enterprise service clouds and data centers to have improved operation.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

Disclosed systems and methods are usable for coordinating deployment and regression testing across data centers and system clusters, including accessing test suites via a versioning platform that maintains a metadata notation of an applicable-version to which a particular version of a test suite applies. The method includes receiving a request-to-test that includes a request from a device or user to run a selected test suite against a selected system, making a machine-to-machine query about the selected system and receiving back a response that specifies a version-to-be-tested, automatically selecting from the versioning platform a test suite version with the applicable-version that supports the version-to-be-tested; consistent with the metadata notation of the applicable-version of the selected test suite; and reporting results of running the selected test suite.

A disclosed method further includes managing associations of an applicable-version needed to run with the particular version of the test suite, with the request-to-test silent regarding a version of the selected test suite to run against a selected system and relies on the automatically selecting. The request-to-test can include multiple selected test suites to run against a selected system or against multiple systems. In some implementations, a version tracking repository stores applicable test suite versions. The version-to-be-tested can be one of a version of a product release, one or more hot fixes for a version of a product between product releases, or an extended version of a product release. Authentication credentials are obtained, responsive to the request-to-test, for use with the selected system when running the selected test suite, in some scenarios.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 3 shows an example GUI for a test automation configuration online service, with service cluster environments listed by product version.

FIG. 4 shows an example user interface with product versions.

FIG. 5 shows an example user interface with test projects by registration name.

FIG. 6 shows details in the example GUI, for a selected test suite.

FIG. 7 displays the example GUI when execute tests is selected.

FIG. 10 displays a GUI with client accounts, identified with an app ID, a client ID and a client secret.

FIG. 11 shows the example GUI overview of test results, with a high level summary with the test environment and product version being tested.

FIG. 12 displays test execution collection details for a test suite for a service cluster environment, for a product version.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

An enterprise company typically deploys applications for their many clients, to multiple service clouds spanning multiple data centers that include one or more hardware stacks per data center.

Existing approaches for implicit coordination of deployment and regression testing across data centers and system clusters for PaaS applications are limited. Release deployment testing occurs for version releases in a production environment, for updates and enhancements planned for release between production version releases, and for staging environments used for pre-testing a product release deployment. Tests can be versioned and associated with a deployed software version being tested. This overcomes the frustration of writing tests with "if then", or case statements that select portions of tests to run by service cluster environment. A need exists to be able to track versions of released test suites, with test suite releases versioned separately from the versioning used for the enterprise product and service deployments.

Developers of product software utilize distributed version control systems to manage development and version control tasks. In one implementation, a GIT version control system is implemented. Using GIT, a branch of a test project can be targeted to a future release of the product. Individual units of work for backwards compatible changes to the production release can branch off the current release. Breaking changes can branch off the appropriate future release branch for a product. A Git tag on a commit within a test project identifies a commit of working software on a master after a release as a semantic version. Named tags on branches can also identify a working commit that has not yet been merged with the master project. Quality engineers need to be able to associate versions of test projects, at the tag and branch level, to released versions of the deployed production environment, so that the appropriate tests can be run against the desired environment and version of the product.

The disclosed technology includes systems and methods for implicitly coordinating deployment and regression testing to multiple service clouds, managing associations in a way that can be updated as versions of the product change and tests are updated and released. This technology ensures that versioning strategies stay compatible with the development of the execution platform and service, An environment for coordinating deployment and regression testing to multiple service clouds spanning multiple data centers that include one or more hardware stacks per data center is described next.

Figure 1:
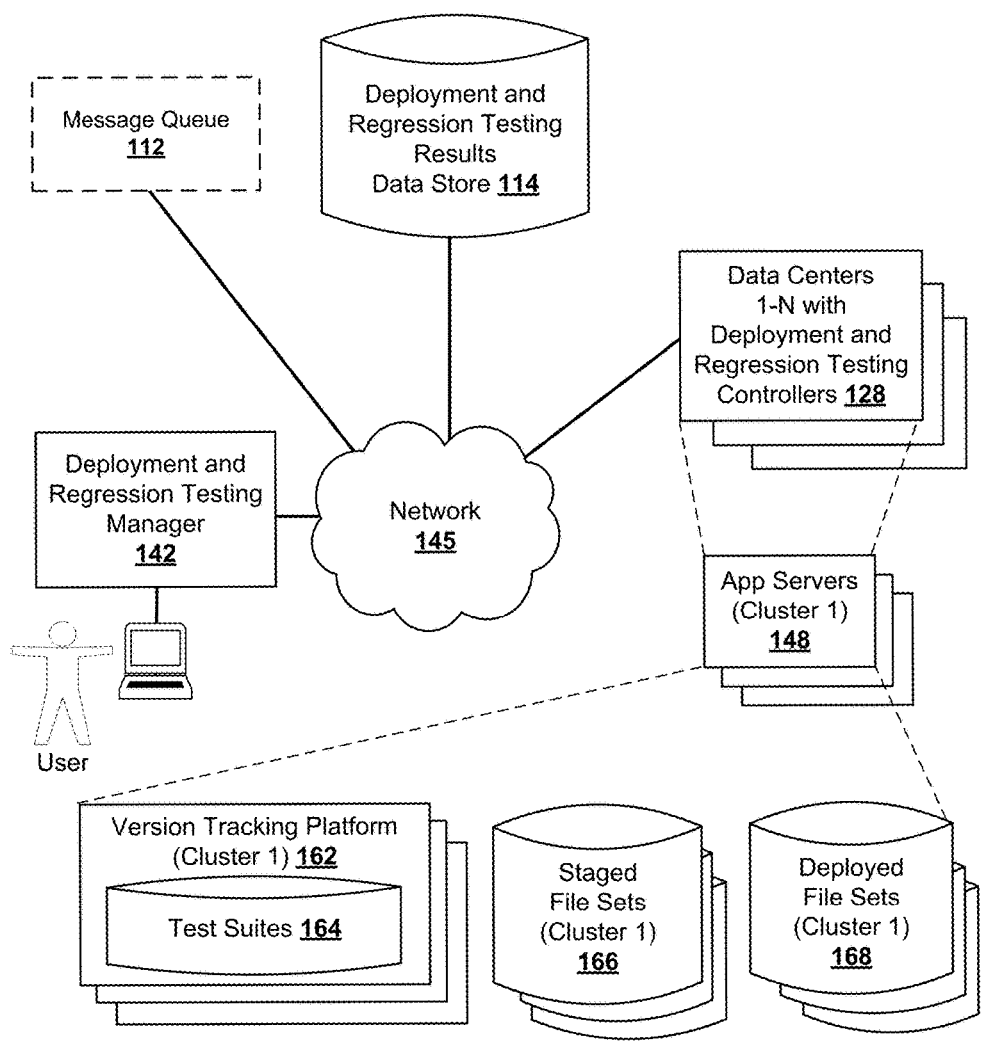
FIG. 1 illustrates one example implementation of an environment for coordinating deployment and regression testing in multiple service clouds spanning multiple data centers.

FIG. 1 illustrates an architectural level schematic of an environment 100 for coordinating deployment and regression testing in multiple service clouds spanning multiple data centers. Because FIG. 1 is an architectural diagram, certain details are intentionally omitted to improve the clarity of the description. Environment 100 includes a deployment and regression testing manager 142 for receiving requests to test from a user. An automated-test developer or quality assurance (QA) engineer also uses the deployment and regression testing manager 142 to add tests to test suites, and to associate versions of test projects to versions of products and environments. The environment also includes network 145.

Environment 100 includes clusters of app servers 148 that serve data centers 1-N, with deployment and regression testing controllers 128 described in detail infra. In some implementations, organizations operate on a single pod. Clusters of servers that handle traffic exist as a logical unit sometimes referred to as a "superpod" which is a group of pods. Version tracking platform 162 includes test suites 164 that include test projects associated with particular production versions of releases in particular environments, test projects for proposed updates for existing production releases, and test projects for planned specific service additions and changes. Version tracking platform 162 also includes metadata notation of the applicable-version to which a particular version of a test suite applies. Staged file sets 166 include staged environments usable for preparing for a version release, including stored staging message information and applications for deployment for a cluster. Deployed file sets 168 include deployed production environment releases. Requests for deployment and regression testing are published to message queue 112. When the message processing system notifies a data center that they have a deployment and regression testing request, at least one of the deployment and regression testing controllers 128 'listening' to the message stream learn that they have a pending request to test.

Additionally environment 100 for implicitly coordinating deployment and regression testing includes a deployment and regression testing results data store 114 that contains an enduring record of testing results, enabling long-term tracking and analysis of coordinated deployment and regression testing. Deployment and regression testing results data store 114 gets updated based on the results of running the selected test suite that supports the version to be tested, as a result of request-to-test messages from message queue 112.

Deployment and regression testing results data store 114 includes read-only datasets, with attributes of multiple environments that have been tested and test projects that have been executed, for particular products and versions for enterprise customers with accounts with specific production versions. Deployment and regression testing results data store 114 can be implemented using a general-purpose distributed memory caching system. In some implementations, data structures can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices. Analytical, read-only databases can implement response times of under two seconds when searching over twenty million records and compiling aggregate statistics from selected records.

Network 145 can be any network or combination of networks of devices that communicate with one another, and communicate among the data stores, servers, and engines described herein. For example, network 145 can be implemented using one or any combination of a LAN (local area network), WAN (wide area network), telephone network (Public Switched Telephone Network (PSTN), Session Initiation Protocol (SIP), 3G, 4G LTE), wireless network, point-to-point network, star network, token ring network, hub network, WiMAX, Wi-Fi, peer-to-peer connections like Bluetooth, Near Field Communication (NFC), Z-Wave, ZigBee, or other appropriate configuration of data networks, including the Internet. In other implementations, other networks can be used such as an intranet, an extranet, a virtual private network (VPN), a non-TCP/IP based network, any LAN or WAN or the like.

The disclosed technology for implicit coordination of deployment and regression testing to multiple service clouds spanning multiple data centers, described in detail below, tracks, stores and makes available deployment and regression testing results, on a request by request basis, in a multi-tenant environment that handles staging and deployment of new versions, minor application updates, and hot fixes for applications. In other implementations, environment 100 may not have the same elements as those listed above and/or may have other/different elements instead of, or in addition to, those listed above.

Figure 2:
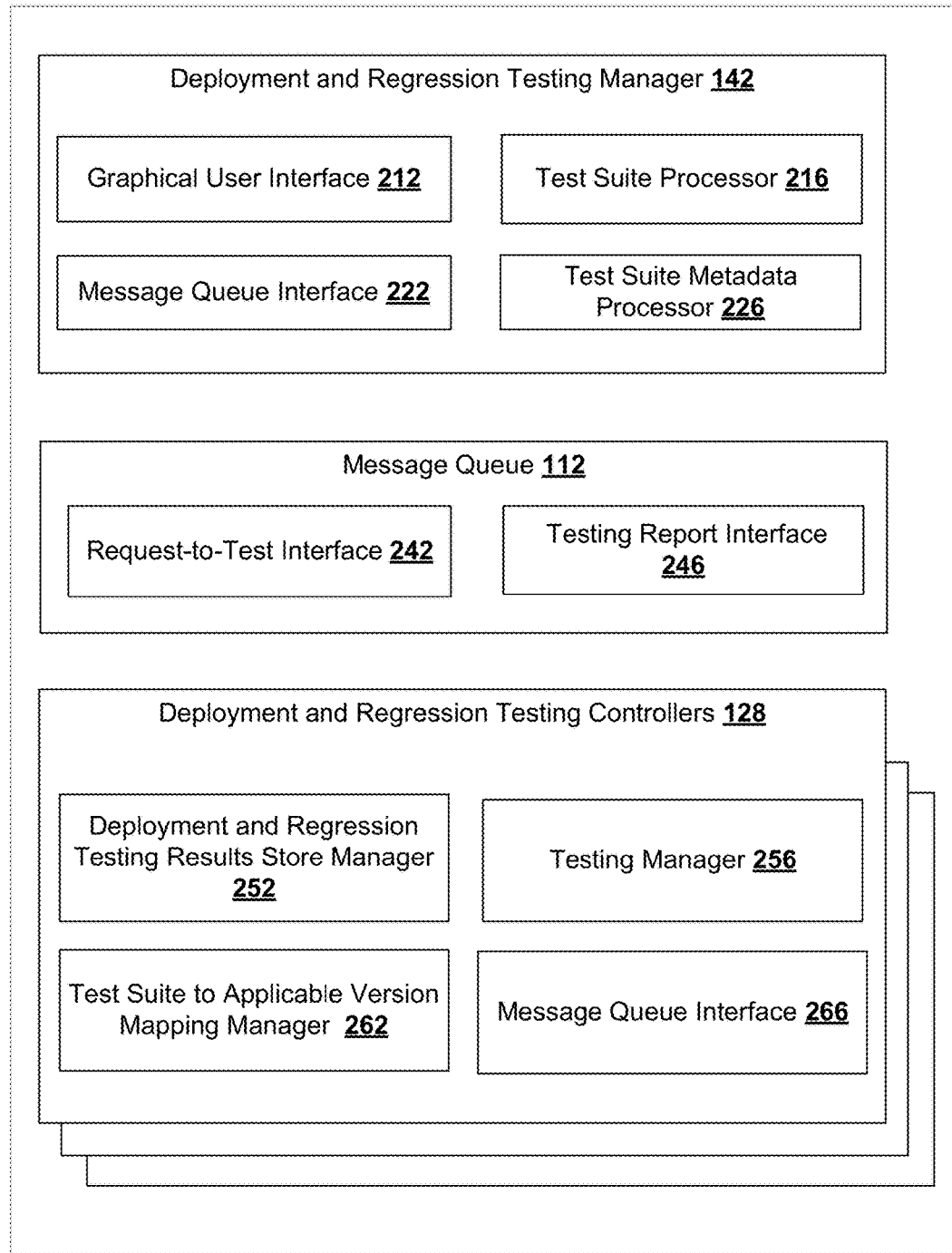
FIG. 2 shows an example block diagram for a deployment and regression testing manager, message queue and deployment and regression testing controllers.

FIG. 2 shows a block diagram with deployment and regression testing manager 142, with graphical user interface (GUI) 212 usable by an automated test developer or QA engineer to enter new and updated test suites and to place requests to test. The GUI also displays results of running the selected test suite. Test suite processor 216 receives the requests to test entered via GUI 212. Test suite metadata processor 226 receives metadata that associates test suites to particular environments and application versions. The test suites can include new tests for production versions that support existing features, bug fixes for tests developed to work on production versions for existing features, and tests targeted to future releases. In some implementations, the test suite can include test modifications to support a fix targeted to a future release, or other file sets not enumerated in this list. In one example, an enterprise has twenty test suites, with multiple versions, for a single cloud-based service environment. In this example, the environment has a single version of production code—a release version and has multiple maintenance releases between major releases.

GUI 212 can take one of a number of forms, running in a browser or as an application, including user interfaces, dashboard interfaces, engagement consoles, and other interfaces, such as mobile interfaces, tablet interfaces, summary interfaces, or wearable interfaces. In some implementations, it can be hosted on a web-based or cloud-based server in an on premise environment. In one implementation, GUI 212 can be accessed from a browser running on a computing device. The browser can be CHROME™, INTERNET EXPLORER™, FIREFOX™ SAFARI™, OPERA™, ANDROID™, BLACKBERRY™ and the like. In other implementations, GUI 212 can run on a computer desktop application.

The request-to-test for a service environment is initiated at the data center via posting of the received request to a work queue accessible by deployment and regression testing controllers 128. The message queue 112 is accessible to deployment and regression testing controllers 128. Continuing with FIG. 2, when test suite processor 216 receives a request-to-test that identifies an environment to test, test suite processor 216 posts the request-to-test task to request-to-test interface 242 of message queue 112, via message queue interface 222. Message queue interface 266 at deployment and regression testing controllers 128 draws the request-to-test task from message queue 112. In some implementations, the version to be tested is one of a version of a product release, one or more hot fixes for a version of a product between product releases, or an extended version of a product release. Use cases describe multiple scenarios in detail infra.

Deployment and regression testing controllers 128 communicate in data centers 1-N. Test suite to applicable version mapping manager 262 makes a machine-to-machine query for information about the selected system and receives back a response that specifies a version-to-be-tested, and automatically selects from the version tracking platform 162 a test suite version that supports the version-to-be-tested, consistent with the metadata notation of the applicable-version of the selected test suite version. Testing manager 256 directs launch of asynchronous, concurrent testing of the multiple app servers 148, using the multiple service clouds, based on the request to run a selected test suite against one or more selected systems.

In one implementation, each data center has a deployment and regression testing controller 128. In other implementations, a single data center can include multiple deployment controllers 128. The FIG. 2 block diagram shows deployment and regression testing controllers 128 with deployment and regression testing results store manager 252 that reports results of running the selected test suite to deployment and regression testing results data store 114, which contains an enduring record of testing results. A test suite can be directed to test work-in-progress environments stored in staged file sets 166, or can test deployed production systems in deployed file sets 168.

The motivation for coordinating deployment and regression testing across data centers and system clusters includes many use case scenarios. In one use case, an automated test engineer needs to write a test against existing functionality. In another use case, the test engineer needs to fix an existing automated test. In both cases, the engineer needs to merge the resulting test into their existing test suite, so they can use it to test for regressions in the product. In a third use case, an automated test engineer writes a new test against new product functionality due in a new release, so that the new feature can be tested. In yet another case, the engineer needs to modify an existing test to support a change due in the new release. In both cases, all other tests need to be able to be run against existing product code that does not include the new functionality, without this new test running and reporting a false negative. Once the new functionality is released to production, the new test or the modified-existing test needs to be merged into the existing test suite. In some cases, release deployment test suites need to be run against a main production product. In other cases, the test suites need to be run against a delayed production product that gets released after most other production environments. In yet other cases, pre-release deployment test suites need to be run against a staging environment, and against a quality assurance (QA) environment; and the pre-release deployment test suites need to be run against production environments before they are released, to identify a baseline before the release and post-release testing. In yet another use case, test suites need to be run against a production environment that has had a release rolled back, so that any regression from the deployed product and rollback can be discovered and addressed. In another use case, one or more test suites need to be run against a production environment that has a new database (DB), running against a specific user on the new DB, so that the new DB can be validated. The disclosed technology for coordinating deployment and regression testing of multiple service clouds spanning multiple data centers is usable by automation test engineers, QA testers and others whose use cases are described supra.

Different versions of a product are customized to run in different environments. FIG. 3 shows an example GUI for a test automation configuration online service (TACOS) with environments 322 listed by product version 336. FIG. 4 shows product versions 424 with version 2016.04.00 462 selected. Maintenance releases, including hot fixes, are labeled with a 0.01, 0.02, 0.03 or 0.04 extension. A next major release will be labeled 2016-05.00 464.

In some cases, new product releases are backwards compatible. That is, the new release software works against the oldest version of the existing product that is currently deployed to production servers. In other cases, breaking changes can be deployed which motivate the need for new tests: either against a feature that does not exist in the oldest version of the product currently deployed to production servers, or a change to an existing test or model to support a change in a feature used by a test that does not exist in that form in the oldest version of the product currently deployed to any or all production servers. In some implementations, if a current version is not available, a lookback algorithm can find an older version of the test suite that is considered applicable and compatible.

Continuing with the example GUI for TACOS, FIG. 5 shows test projects 524 by registration name. The selected test in this example, listed by registration name, is active audience tests 562. For some uses cases, stable unchanged test versions that worked on an earlier release can be applied to projects that utilize the same production code as the code used in the earlier release. This enables test owners to avoid constantly updating their test versions. Instead, the test engineer can associate a version of their test with a release. That is, when functionality of production system does not change, there is no need to create new tests. For example, a new production system always needs to test email functionality, but no new test needs to be generated for each product release. If a test fails on 2016-05.00 464 after successfully running on version 2016.04.00 462, then test personnel can deduce that a bug has been introduced because no new changes were introduced to email functionality or email-related tests.

FIG. 6 shows details in the example GUI, for the selected test suite—active audience test 622. The details include the GitHub repository link—URL 642 which enables the pulling of the correct version of tests projects stored in GitHub for a specific product release of a marketing cloud core automation service product—a version of an enterprise cloud-based product. For the example shown, for product version 2016-03.00 664 the branch of active audience tests with a version after 201603 662 automatically gets selected from the versioning platform, consistent with the metadata notation of the applicable-version of the selected test suite version.

Figure 8:
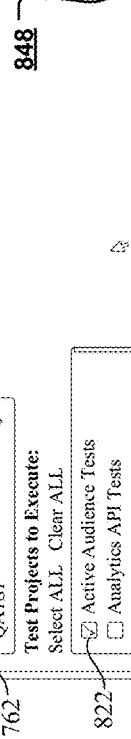
FIG. 8 illustrates a graphical UI execute tests dialog for configuring a selected service cluster environment.

Further continuing with the example GUI for TACOS, FIG. 7 shows the example GUI when the tab for execute tests 728 is active. The dropdown menu for select an environment 722 lists the choices for environment to test. Highlighted QA1S1 762 is selected as the service cluster environment to test. FIG. 8 shows the execute tests dialog for configuring selected QA1S1 762 service cluster environment. The dropdown menu, for test projects to execute, lists test suite options, including selected active audience tests 822. In some cases, the test engineer can select all test projects for an environment. Tags refer to work-in-progress that is static at a point in time. Tags to execute 848 enables the choice of running a scenario if any of a list of tags is included or if every one of a list of tags are included, to pull the correct version of Active Audience Tests to match the selected service cluster environment to test QA1S1 762.

Figure 9:
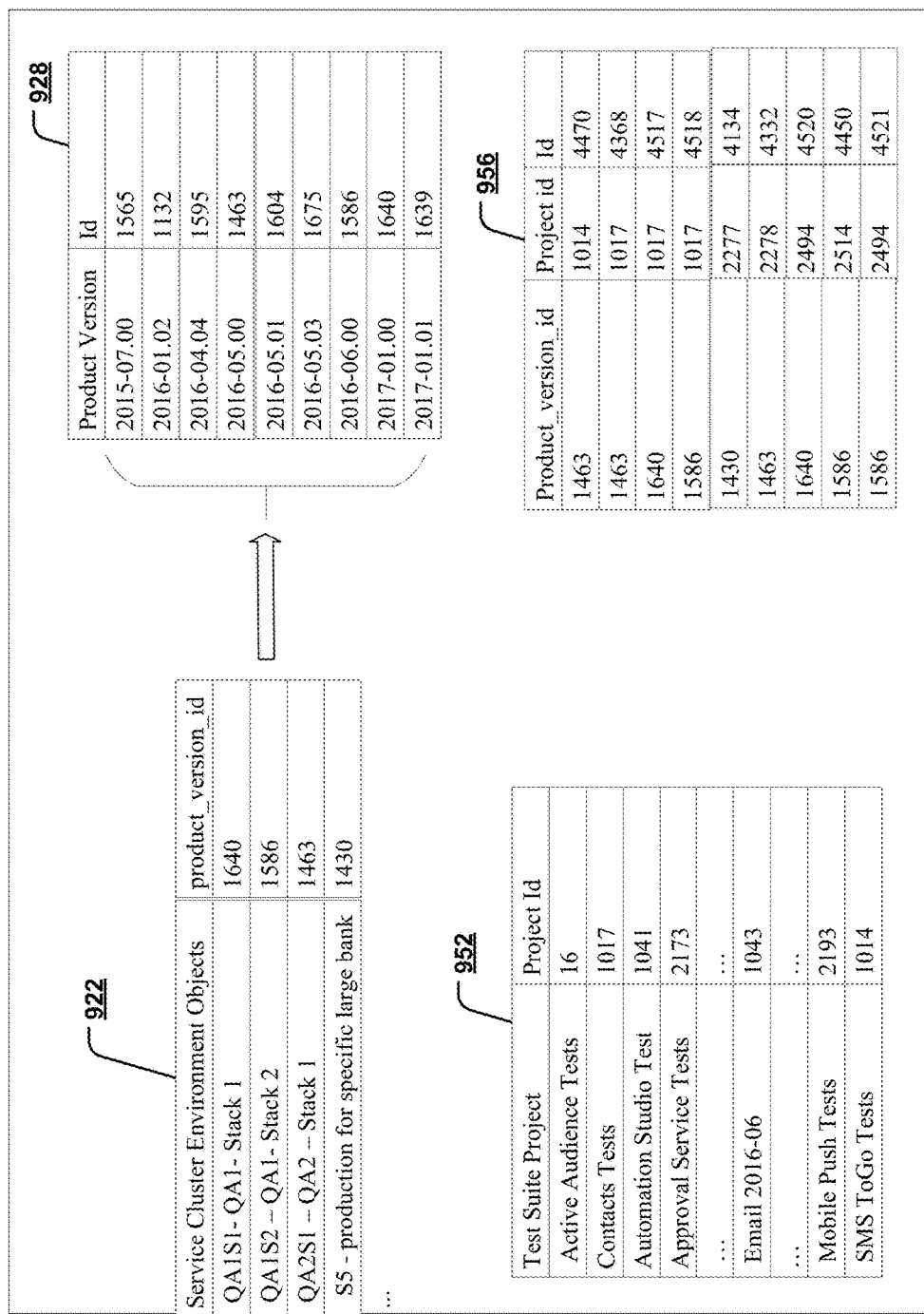
FIG. 9 shows example data structures for service cluster environment objects, product versions, and test suite versions.

FIG. 9 shows data structures for service cluster environment objects 922 associated with their product version ids, product versions 928 by name in the format of [YEAR]-[MAJOR].[MINOR] with ids, test suite projects 952 by test project name and associated test project id. Data structure 956 relates project ids for tests to product version ids, and identifier, and for a particular test suite 956.

From an algorithm and code perspective, the service cluster environment 922 is specified as a code object, product versions 928 as object and test suite projects 952 as objects, and the disclosed method associates a specific service cluster environment to the product version by id and to the test suite projects selected for that product version. Upon receipt of a request-to-test from a device or user that includes a request to run a selected test suite against a selected system, the disclosed system makes a machine-to-machine query for information about the selected system and receives back a response that specifies a version-to-be-tested. The system automatically selects from the versioning platform a test suite version that supports the version-to-be-tested, consistent with the metadata notation of the applicable-version of the selected test suite version; and reports results of running the selected test suite.

An example algorithm is described and code excerpts are listed next, for finding the correct version of a test to run against a given version of an identified product—utilizing a method that chooses the version of a test project to be run against the product, given the ID of the test project, test_project_id, and the version of the product selected for testing, target_product_version. Multiple other methods are called to retrieve data and find the best match. The find_match method takes, as input, an ordered collection of test projects that are active and can be used to test the product under test. It counts down from the highest (most recent) product version the test project can test until it finds a version of the test project registered to a product version that is less than or equal to the version of the product under test, to yield the version of the test project capable of testing the highest (most recent) version of the product that isn't registered to test only newer versions of the product. That is, this code snippet selects the test project that tests the highest version of the product without going over the version of the product being targeted, relying on potential_matches to be ordered by product_version string in descending order, with newest version first.

```
class ProjectVersionSelectionStrategy
  def self.select_project_version(test_project_id:, target_product_version:)
    project = Tacos::Project.find_by_id(test_project_id)
# Validate inputs
# Get a list of records that could be used to test this version of the product,
# sorted in descending order of product version tested.
    potential_matches = get_potential_matches(:test_project_id => test_project_id)
# Find best match and return
# Sort through the list of received potential matches, find the
# best match for the version of the product under test, and return that record.
# Return record to system, which executes chosen version of the test project.
    match = find_match(:potential_matches  => potential_matches,
             :target_product_version => target_product_version,
             :test_project_name   => project.name)
    match
  end
  def self.find_match(potential_matches:, target_product_version:, test_project_name:)
    lowest_product_version = ProductVersionNumber.new("0000-00")
    potential_matches.each do |m|
      pv = Tacos::ProductVersion.find(m.product_version_id).version
      target_product_version_number =
          ProductVersionNumber.new(target_product_version)
      potential_match_product_version = ProductVersionNumber.new(pv)
      lowest_product_version = potential_match_product_version
      return m.id if potential_match_product_version <= target_product_version_number
    end
    # Error if no match
    message = "No active test project version for test project - '#{test_project_name}" "\
         "found with an associated product version less than or equal to the
         target version "\
         "of #{target_product_version}. "\
         "Closest match is #{lowest_product_version.to_s_zero_pad}"
    @logger.error(message)
    raise ProjectVersionNotFoundError, message
  end
 end
end
```

Continuing the description of the disclosed technology with example code excerpts, the ProductVersionNumber class represents the semantic versioning scheme used to version different releases of the same product. In one case, the format represented is [YEAR]-[MAJOR].[MINOR]. For example, the first released version of the software product in the year 2016 would be "2016-01". Minor updates to that same product are often released before the next major update. These are also called micro-releases or MR. Upon release of the first MR to 2016-01, the product version becomes 2016-01.01. A second MR would be version 2016-01.02. The next major version of the product released is version 2016-02. Notice that the MR is optional, and resets to zero when the major version is incremented. When the next major release is in a new year, the YEAR field is incremented and the major version resets to one. In this versioning scheme, YEAR is the most significant "digit", followed by the MAJOR release number, and then the minor release number. This example labeling approach can also be applied to support more general schemes where the year is not used. For example, a versioning scheme of [MAJOR].[MINOR].[PATCH] follows a similar pattern, resetting the less significant fields to zero or one whenever a more significant field is incremented.

For automatically selecting, from the versioning platform, a test suite version that supports the version-to-be-tested, consistent with the metadata notation of the applicable-version of the selected test suite version, an important aspect for test version selection is the ability to sort and order the records. FIG. 9 data structures show the product versions each represented as a single version value, with an associated human-readable representation. In one example, initial values to be sorted can be of the form listed next.
1. 2016-02.01
2. 2017-01.01
3. 2017-01.00
4. 2016-01.02
5. 2016-01.00
6. 2015-07.00

The sorted product versions for the example are listed next. In one implementation, SMS To Go Tests is identified with MC-core automation org, repository SMSToGoAPITests and the related URL of the tests stored in GitHub.
1. 2015-07.00
2. 2016-01.00
3. 2016-01.02
4. 2016-02.01
5. 2017-01.00
6. 2017-01.01

1014 SMS ToGo Tests MC-CoreAutomation SMSToGoAPITests git@github.exacttarget.com:MC-CoreAutomation/SMSToGoAPITests.git An example implementation of the disclosed method includes the code snippet, listed below, usable for making choices based on whether a record supports a version of the product that is less-than, equal-to, or greater-than the version the user wants to test. As long as the ProductVersionNumber can be sorted and compared to other instances of the class, the format of the product version is not consequential. Separators such as '.' and '-' add readability, as does the choice to use numerical digits and not letters. The code snippet listed next includes an implementation of operators used for comparison and sorting.

```
class ProductVersionNumber
   attr_accessor :year, :release, :mr
   def initialize(version_string)
      version_parts = version_string.split("-")
      self.year = version_parts[0].to_i
      version_parts = version_parts[1].split(".")
      self.release = version_parts[0].to_i
      self.mr = (version_parts[1].to_i if
      version_parts[1].present?) || 0
   end
#Implementation of operators used for comparison
and sorting:
   def <(other)
      -1 == (self <=> other)
   end
   def > (other)
      1 == (self <=> other)
   end
   def == (other)
      0 == (self <=> other)
   end
   def >= (other)
      -1 < (self <=> other)
   end
   def <= (other)
      1 > (self <=> other)
   end
   def <=> (other)
      case
      when year == other.year && release ==
      other.release && mr == other.mr
         0
      when year == other.year && release ==
      other.release && mr != other.mr
         mr <=> other.mr
      when year == other.year && release !=
      other.release
         release <=> other.release
      else
         year <=> other. year
      end
   end
   def to _s
      "#{year}-#{release}.#{mr}"
   end
   def to_s_zero_pad
      zero_padded = "#{format('%04d', year)}-
                     #{format('%02d', release)}.
                     #{format('%02d', mr)}"
      zero_padded
   end
   def self.validate?(product_version:)
      # rubocop:disable Style/CaseEquality
      /\A[\d]{4}-[\d]{2}([\.]{1}[\d]{1,2})?\z/i
      === product_version
   end
end
end
```

Client accounts are registered for specific service environments, with some example representations described next. After a test suite version for testing the service environment is automatically selected from the versioning platform, the correct account for a client gets pulled at runtime. A test suite can include a feature file with a number of scenarios. A feature can be tagged as accessible across multiple accounts, and the system will inject the account into the test at runtime. FIG. 10 shows accounts, identified with an app ID 1022—a unique identifier. In one implementation, an app ID is a globally unique identifier in the format of a GUID; in another implementation, an app ID can be in the format of a UUID. Client ID 1024 is a random string of characters that represent each client uniquely. In one implementation, client secret 1026 is represented with a 24-character string usable for enabling authentication credentials for a client. The credentials match the specific environment being tested. In one implementation of the disclosed technology, Cucumber.io—an open source product for managing executable specifications, gets extended to have runtime injection of accounts, with scaling for multiple environments, for testing a product that can run against multiple environments. In one case, test suites can be run against multiple environments, enabling scaling to 30-50 environments with a single set of tests and keywords.

Figure 11:
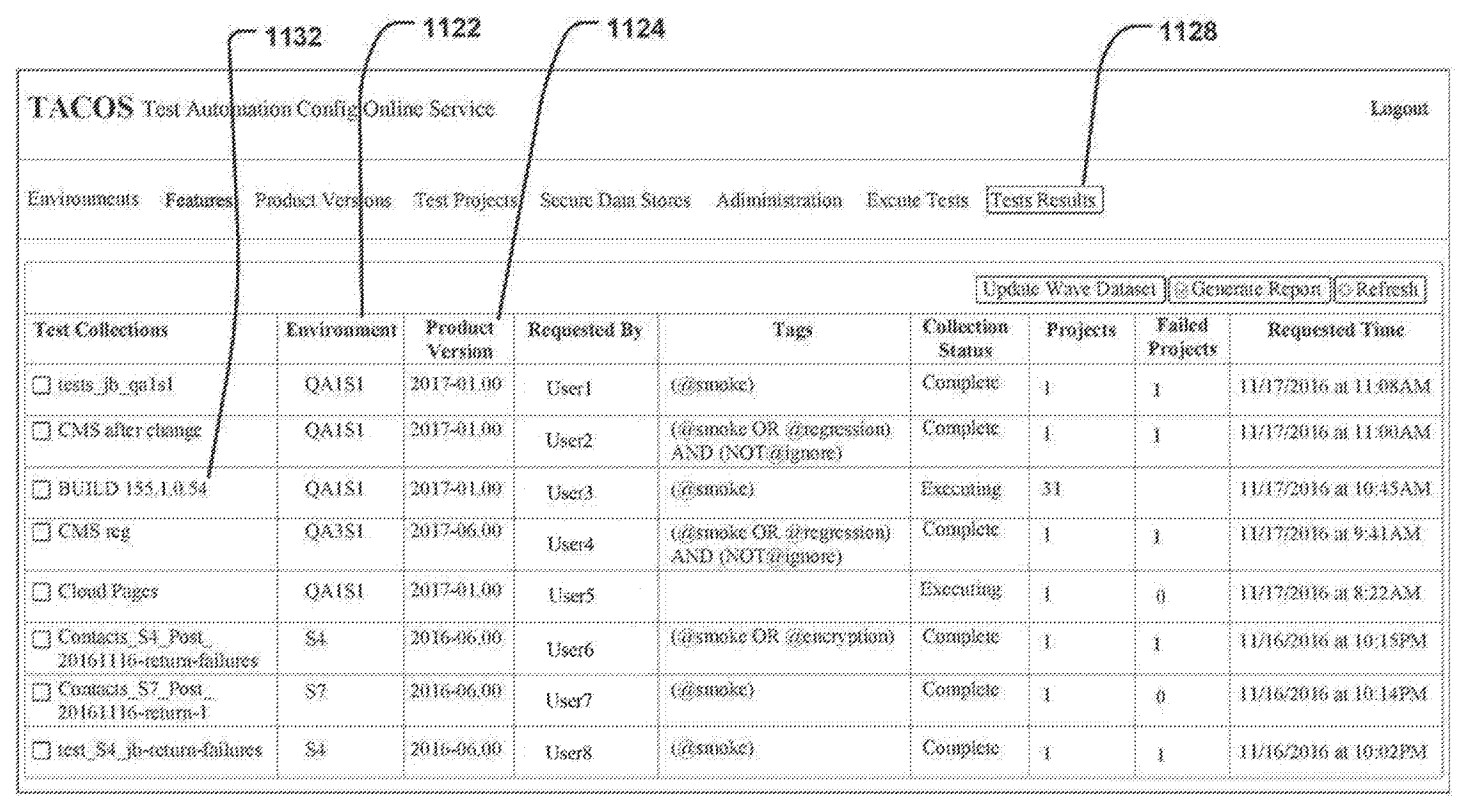

FIG. 11 shows the example GUI overview of test results 1128, displaying a high-level summary of each user request, along with the test environment 1122 and the product version 1124 that is being tested. Details for a particular test get displayed as a result of selection of the test collection. FIG. 12 shows test execution collection details 1222 for test collection BUILD 155.1.0.54 1132 for service cluster environment QA1S1 for product version 2017-01.00, as displayed when the user clicks on the test collection name in the test results screen. Scenario counts are broken down by total scenarios 1224, number passed, number failed, the environment and product version tested, and the project version used to do the testing, which can be different for each test project that was run.

In one use case, a test developer fixes a bug in an older version of a test because both the older version and a newer version remain in use. In another use case, test developers design tests that are backwards compatible, fixing a bug identified in an older version of the test in the new version of the test, and wait for the old version of the test to be discontinued, or age out.

An advantage of coordinating deployment and regression testing across data centers and system clusters includes associating a test project only once, when a test suite changes. Additionally, the disclosed methods and systems make it possible to avoid needlessly changing test versions for applicable-versions of products when the tests do not need to be changed, resulting in fewer human interactions and fewer human-introduced errors.

Figure 13:
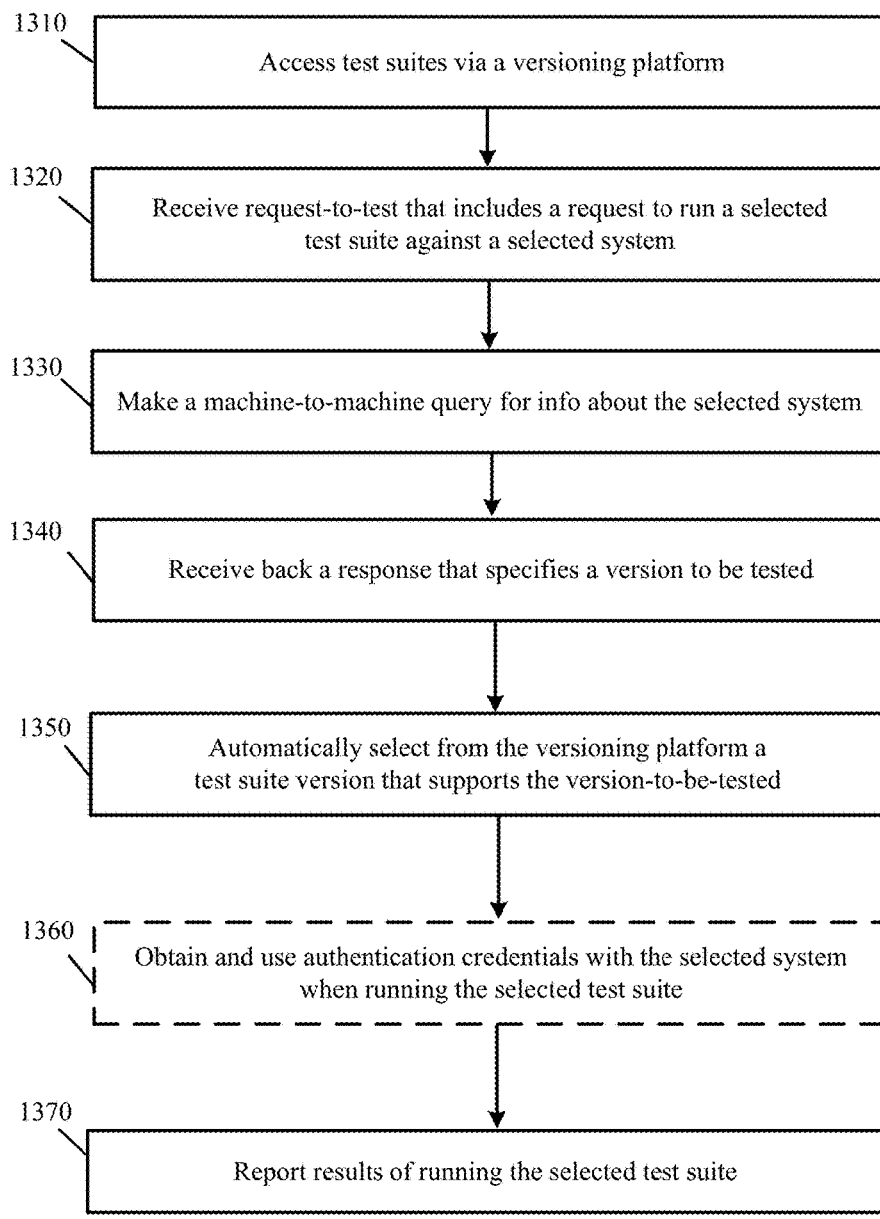
FIG. 13 shows one example workflow for coordinating deployment and regression testing of releases, updates and hot fixes.

FIG. 13 shows an example workflow 1300 of one implementation for coordinating deployment and regression testing across data centers and system clusters to multiple service clouds spanning multiple data centers that include one or more hardware stacks per data center. Workflow 1300 can be implemented at least partially with a database system, e.g., by one or more processors configured to receive or retrieve information, process the information, store results, and transmit the results. Other implementations may perform the steps in different orders and/or with different, fewer or additional steps than the ones illustrated in FIG. 13. Multiple steps can be combined in some implementations.

At action 1310, accessing test suites via a versioning platform that maintains a metadata notation of an applicable-version to which a particular version of a test suite applies.

At action 1320, receiving a request-to-test from a device or user that includes a request to run a selected test suite against a selected system.

At action 1330, making a machine-to-machine query for information about the selected system.

At action 1340, receiving back a response that specifies a version-to-be-tested.

At action 1350, automatically selecting from the versioning platform a test suite version that supports the version-to-be-tested, consistent with the metadata notation of the applicable-version of the selected test suite version.

At action 1360, in some implementations, obtaining and utilizing authentication credentials with the selected system when running the selected test suite.

At action 1370, reporting results of running the selected test suite.

The actions described above can be subdivided into more steps or combined into fewer steps to carry out the method described using a different number or arrangement of steps.

Computer System

Figure 14:
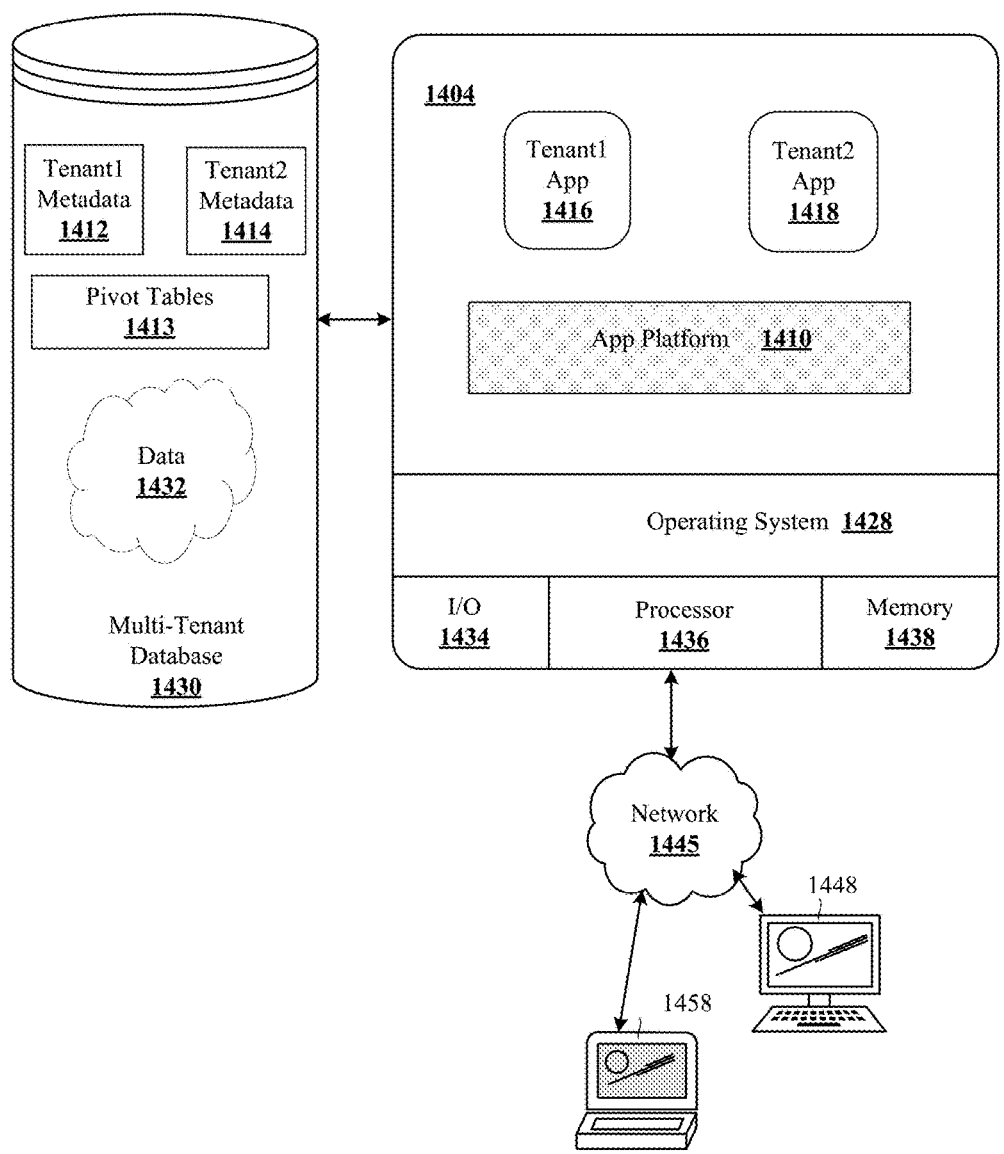
FIG. 14 is a block diagram of an example computer system for coordinating deployment and regression testing in multiple service clouds spanning multiple data centers in a multi-tenant environment.

FIG. 14 presents a block diagram of an exemplary multi-tenant system 1400 suitable for implementing coordination of deployment and regression testing across data centers and system clusters in environment 100 of FIG. 1. In general, the illustrated multi-tenant system 1400 of FIG. 14 includes a server 1404 that dynamically creates and supports virtual applications 1416 and 1418, based upon data 1432 from a common multi-tenant database 1430 that is shared between multiple tenants, alternatively referred to herein as a "multi-tenant database". Data and services generated by the virtual applications 1416 and 1418, including GUI clients, are provided via a network 1445 to any number of client devices 1448 or 1458, as desired.

As used herein, a "tenant" or an "organization" refers to a group of one or more users that shares access to common subset of the data within the multi-tenant database 1430. In this regard, each tenant includes one or more users associated with, assigned to, or otherwise belonging to that respective tenant. Stated another way, each respective user within the multi-tenant system 1400 is associated with, assigned to, or otherwise belongs to a particular tenant of the plurality of tenants supported by the multi-tenant system 1400. Tenants may represent users, user departments, work or legal organizations, and/or any other entities that maintain data for particular sets of users within the multi-tenant system 1400. Although multiple tenants may share access to the server 1404 and the database 1430, the particular data and services provided from the server 1404 to each tenant can be securely isolated from those provided to other tenants. The multi-tenant architecture therefore allows different sets of users to share functionality and hardware resources without necessarily sharing any of the data 1432 belonging to or otherwise associated with other tenants.

The multi-tenant database 1430 is any sort of repository or other data storage system capable of storing and managing the data 1432 associated with any number of tenants. The database 1430 may be implemented using any type of conventional database server hardware. In various implementations, the database 1430 shares processing hardware with the server 1404. In other implementations, the database 1430 is implemented using separate physical and/or virtual database server hardware that communicates with the server 1404 to perform the various functions described herein. The multi-tenant database 1430 may alternatively be referred to herein as an on-demand database, in that the multi-tenant database 1430 provides (or is available to provide) data at run-time to on-demand virtual applications 1416 or 1418 generated by the application platform 1410, with tenant1 metadata 1412 and tenant2 metadata 1414 securely isolated.

In practice, the data 1432 may be organized and formatted in any manner to support the application platform 1410. In various implementations, conventional data relationships are established using any number of pivot tables 1413 that establish indexing, uniqueness, relationships between entities, and/or other aspects of conventional database organization as desired.

The server 1404 is implemented using one or more actual and/or virtual computing systems that collectively provide the dynamic application platform 1410 for generating the virtual applications. For example, the server 1404 may be implemented using a cluster of actual and/or virtual servers operating in conjunction with each other, typically in association with conventional network communications, cluster management, load balancing and other features as appropriate. The server 1404 operates with any sort of conventional processing hardware such as a processor 1436, memory 1438, input/output features 1434 and the like. The input/output devices 1434 generally represent the interface(s) to networks (e.g., to the network 1445, or any other local area, wide area or other network), mass storage, display devices, data entry devices and/or the like. User interface input devices 1434 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include possible types of devices and ways to input information into server 1404.

User interface output devices can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from processor 1436 to the user or to another machine or computer system.

The processor 1436 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 1438 represents any non-transitory short or long term storage or other computer-readable media capable of storing programming instructions for execution on the processor 1436, including any sort of random access memory (RAM), read only memory (ROM), flash memory, magnetic or optical mass storage, and/or the like. The computer-executable programming instructions, when read and executed by the server 1404 and/or processor 1436, cause the server 1404 and/or processor 1436 to create, generate, or otherwise facilitate the application platform 1410 and/or virtual applications 1416 and 1418, and perform one or more additional tasks, operations, functions, and/or processes described herein. It should be noted that the memory 1438 represents one suitable implementation of such computer-readable media, and alternatively or additionally, the server 1404 could receive and cooperate with external computer-readable media that is realized as a portable or mobile component or application platform, e.g., a portable hard drive, a USB flash drive, an optical disc, or the like.

The application platform 1410 is any sort of software application or other data processing engine that generates the virtual applications 1416 and 1418 that provide data and/or services to the client devices 1448 and 1458. In a typical implementation, the application platform 1410 gains access to processing resources, communications interfaces and other features of the processing hardware using any sort of conventional or proprietary operating system 1428. The virtual applications 1416 and 1418 are typically generated at run-time in response to input received from the client devices 1448 and 1458.

With continued reference to FIG. 14, the data and services provided by the server 1404 can be retrieved using any sort of personal computer, mobile telephone, tablet or other network-enabled client device 1448 or 1458 on the network 1445. In an exemplary implementation, the client device 1448 or 1458 includes a display device, such as a monitor, screen, or another conventional electronic display capable of graphically presenting data and/or information retrieved from the multi-tenant database 1430.

In some implementations, network(s) 1445 can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

The technology disclosed can be implemented in the context of any computer-implemented system including a database system, a multi-tenant environment, or a relational database implementation like an ORACLE™ compatible database implementation, an IBM DB2 Enterprise Server compatible relational database implementation, a MySQL or PostgreSQL compatible relational database implementation or a Microsoft SQL Server compatible relational database implementation or a NoSQL non-relational database implementation such as a Vampire™ compatible non-relational database implementation, an Apache Cassandra™ compatible non-relational database implementation, a BigTable compatible non-relational database implementation or an HBase or DynamoDB compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Particular Implementations

Some particular implementations and features are described in the following discussion.

In one implementation, a disclosed method of coordinating deployment and regression testing across data centers and system clusters includes accessing test suites via a versioning platform that maintains a metadata notation of an applicable-version to which a particular version of a test suite applies. The method also includes receiving a request-to-test from a device or user that includes a request to run a selected test suite against a selected system; and making a machine-to-machine query for information about the selected system and receiving back a response that specifies a version-to-be-tested. The disclosed method further includes automatically selecting from the versioning platform a test suite version that supports the version-to-be-tested, consistent with the metadata notation of the applicable-version of the selected test suite version; and reporting results of running the selected test suite.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features that implement staging and deployment launch.

Some implementations of the disclosed method include managing associations of an applicable-version needed to run, with the particular version of the test suite. For the disclosed method, the request-to-test is silent regarding a version of the selected test suite to run against a selected system and relies on the automatically selecting. In one implementation, the request-to-test specifies multiple selected test suites to run against a selected system. In some cases, the request-to-test specifies multiple systems against which to run the multiple selected test suites.

One implementation of the disclosed method includes making the machine-to-machine query directly to the selected system. In another implementation, the disclosed method includes making the machine-to-machine query to a version tracking repository that stores applicable test suite versions.

In some implementations of the disclosed method, the version-to-be-tested is one of a version of a product release, a hot fix for a version of a product between product releases, or an extended version of a product release. In other implementations, the version to be tested is a QA version, and another version to be tested can be a production release that has had a rollback. In one case, one or more test suites need to be run against a production environment that has a new DB, running against a specific user on the new DB, so that the new DB can be validated.

Some implementations of the disclosed method include, responsive to the request-to-test, obtaining authentication credentials to use with the selected system when running the selected test suite. The implementations further include, responsive to the request-to-test, running the selected test suite against the selected system with the authentication credentials.

In one implementation, a disclosed system, which includes one or more devices, coordinates deployment and regression testing to multiple service clouds spanning multiple data centers that include one or more hardware stacks per data center. The disclosed system includes deployment and regression testing controllers deployed at each of the service clouds, each including a processor, memory coupled to the processor, and program instructions executable on the processor. The program instructions, when executed, cause the respective deployment and regression testing controller to implement any of the methods described supra.

Yet another implementation may include a non-transitory tangible computer readable storage medium including computer program instructions that cause a computer to implement any of the methods described above or that are used to build any of the systems described above. The tangible computer readable storage medium does not include transitory signals.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A method of coordinating deployment and regression testing across data centers and system clusters, including:
   accessing test suites via a versioning platform that maintains a metadata notation of an applicable-version of a product to which a particular version of a test suite applies;
   receiving a request-to-test from a device or user that includes a request to run a selected test suite against a selected system;
   making a machine-to-machine query for information about the selected system and receiving back a response that specifies a product version-to-be-tested;
   automatically selecting from the versioning platform a most recent test suite version that is associated with the product version-to-be-tested, consistent with the metadata notation of the applicable-version of the selected test suite version, by disqualifying test suite versions associated with only more recent product versions than the version-to-be-tested;
   selecting a client account registered with the selected system for the product;
   obtaining authentication credentials for the selected client account to use with the selected system when running the selected test suite;
   injecting the selected client account into the selected test suite at runtime;
   running the selected test suite version of the selected test suite against the selected system with authentication credentials for the selected client account; and
   reporting results of running the selected test suite.

2. The method of claim 1, further including managing associations of an applicable-version needed to run, with the particular version of the test suite.

3. The method of claim 1, wherein the request-to-test is silent regarding a version of the selected test suite to run against a selected system and relies on the automatically selecting.

4. The method of claim 3, wherein the request-to-test specifies multiple selected test suites to run against a selected system.

5. The method of claim 4, wherein the request-to-test specifies multiple systems against which to run the multiple selected test suites.

6. The method of claim 5, further comprising, for each system of the multiple systems:
   automatically selecting, from the versioning platform, a most recent test suite version that is associated, in the metadata notation, with a product version-to-be-tested present on the each system,
   wherein, for at least two of the multiple systems having different versions-to-be-tested of the same product, the same test suite version is selected.

7. The method of claim 1, further including making the machine-to-machine query directly to the selected system.

8. The method of claim 1, further including making the machine-to-machine query to a version tracking repository that stores applicable test suite versions.

9. The method of claim 1, wherein the version-to-be-tested is one of a version of a product release, a hot fix for a version of a product between product releases, or an extended version of a product release.

10. A system that coordinates deployment and regression testing to multiple service clouds spanning multiple data centers that include one or more hardware stacks per data center, the system including deployment and regression testing controllers, including:
    the deployment and regression testing controllers deployed at each of the service clouds, each including a processor, memory coupled to the processor, and program instructions executable on the processor;
    wherein the program instructions, when executed, cause the respective deployment and regression testing controller to implement a method including:
    accessing test suites via a versioning platform that maintains a metadata notation of an applicable-version of a product to which a particular version of a test suite applies;
    receiving a request-to-test from a device or user that includes a request to run a selected test suite against a selected system;
    making a machine-to-machine query for information about the selected system and receiving back a response that specifies a product version-to-be-tested;
    automatically selecting from the versioning platform a most recent test suite version that is associated with the product version-to-be-tested, consistent with the metadata notation of the applicable-version of the selected test suite version, by disqualifying the test suite versions associated with only more recent product versions than the version-to-be-tested;
    selecting a client account registered with the selected system for the product;
    obtaining authentication credentials for the selected client account to use with the selected system when running the selected test suite;
    injecting the selected client account into the selected test suite at runtime;
    running the selected test suite version of the selected test suite against the selected system with authentication credentials for the selected client account; and
    reporting results of running the selected test suite.

11. The system of claim 10, wherein the program instructions, when executed, further implement managing associations of an applicable-version needed to run, with the particular version of the test suite.

12. The system of claim 10, wherein the request-to-test is silent regarding a version of the selected test suite to run against a selected system and relies on the automatically selecting.

13. The system of claim 12, wherein the request-to-test specifies multiple selected test suites to run against a selected system.

14. The system of claim 13, wherein the request-to-test specifies multiple systems against which to run the multiple selected test suites.

15. The system of claim 10, wherein the program instructions, when executed, further implement making the machine-to-machine query to the selected system.

16. The system of claim 10, wherein the program instructions, when executed, further implement making the machine-to-machine query to a version tracking repository that stores applicable test suite versions.

17. The system of claim 10, wherein the version-to-be-tested is one of a version of a product release, a hot fix for a version of a product between product releases, or an extended version of a product release.

18. A non-transitory computer readable medium, including program instructions executable on a processor, wherein the instructions, when executed, implement: at deployment and regression testing controllers at each service cloud, each including a processor, a method including:

accessing test suites via a versioning platform that maintains a metadata notation of an applicable-version of a product to which a particular version of a test suite applies;

receiving a request-to-test from a device or user that includes a request to run a selected test suite against a selected system;

making a machine-to-machine query for information about the selected system and receiving back a response that specifies a product version-to-be-tested;

automatically selecting from the versioning platform a most recent test suite version that is associated with the product version-to-be-tested, consistent with the metadata notation of the applicable-version of the selected test suite version, by disqualifying the test suite versions associated with only more recent product versions than the version-to-be-tested;

selecting a client account registered with the selected system for the product;

obtaining authentication credentials for the selected client account to use with the selected system when running the selected test suite;

injecting the selected client account into the selected test suite at runtime;

running the selected test suite version of the selected test suite against the selected system with authentication credentials for the selected client account; and reporting results of running the selected test suite.

19. The non-transitory computer readable medium of claim 18, further including managing associations of an applicable-version needed to run, with the particular version of the test suite.

20. The non-transitory computer readable medium of claim 18, wherein the request-to-test specifies multiple systems against which to run selected test suites.

21. The non-transitory computer readable medium of claim 18, further including making the machine-to-machine query to a version tracking repository that stores applicable test suite versions.

22. The non-transitory computer readable medium of claim 18, wherein the version-to-be-tested is one of a version of a product release, a hot fix for a version of a product between product releases, or an extended version of a product release.

* * * * *